(12) United States Patent
Yadav et al.

(10) Patent No.: US 9,588,716 B1
(45) Date of Patent: Mar. 7, 2017

(54) METHOD AND SYSTEM FOR BACKUP OPERATIONS FOR SHARED VOLUMES

(71) Applicant: EMC Corporation, Hopkinton, MA (US)

(72) Inventors: Sunil Kumar Yadav, Bangalore (IN); Soumen Acharya, Bangalore (IN); Suman Tokuri, Bangalore (IN); Gajendran Raghunathan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 687 days.

(21) Appl. No.: 14/036,177

(22) Filed: Sep. 25, 2013

(51) Int. Cl.
*G06F 12/00* (2006.01)
*G06F 3/06* (2006.01)

(52) U.S. Cl.
CPC ............ *G06F 3/0665* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 9,146,790 | B1* | 9/2015 | Dash | G06F 11/00 |
| 2006/0031636 | A1* | 2/2006 | Mizuno | G06F 3/0605 |
| | | | | 711/114 |
| 2012/0303585 | A1* | 11/2012 | Zuckerman | G06F 17/30088 |
| | | | | 707/649 |

* cited by examiner

*Primary Examiner* — Daniel Tsui

(74) *Attorney, Agent, or Firm* — Dergosits & Noah LLP; Todd A. Noah

(57) ABSTRACT

Backup operations for shared volumes are described. A shared volume is identified as used by a virtual machine scheduled for a backup operation by a first distributed system node. A second distributed system node is identified that has a responsibility for sending control signals to the shared volume. An association is saved of the second distributed system node to the shared volume. The responsibility for sending control signals to the shared volume is assigned to the first distributed system node. The backup operation is executed for the shared volume by the first distributed system node. The responsibility for sending control signals to the shared volume is assigned to the second distributed system node.

20 Claims, 3 Drawing Sheets

300

Identify shared volume used by virtual machine scheduled for backup operation by first distributed system node. 302

Identify second distributed system node that has responsibility for sending control signals to shared volume. 304

Save association of the second distributed system node to shared volume. 306

Assign responsibility for sending control signals to shared volume to first distributed system node. 308

Execute backup operation for shared volume by first distributed system node. 310

Assign responsibility for sending control signals to shared volume to second distributed system node. 312

METHOD AND SYSTEM FOR BACKUP OPERATIONS FOR SHARED VOLUMES

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the database with a copy of the backup files corresponding to that state.

A virtual machine executing in a distributed system node may store its database to a volume associated with its distributed system node or to another volume associated with another distributed system node. For example, a virtual machine's distributed system node may fail, which results in the virtual machine migrating to another distributed system node, but the virtual machine may continue to store its database to a volume owned by the failed distributed system node. A backup application may not only create and store a copy of each desired database state stored in a volume for a virtual machine, but also create and store a copy of the virtual machine itself to enable subsequent restoration of the virtual machine.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
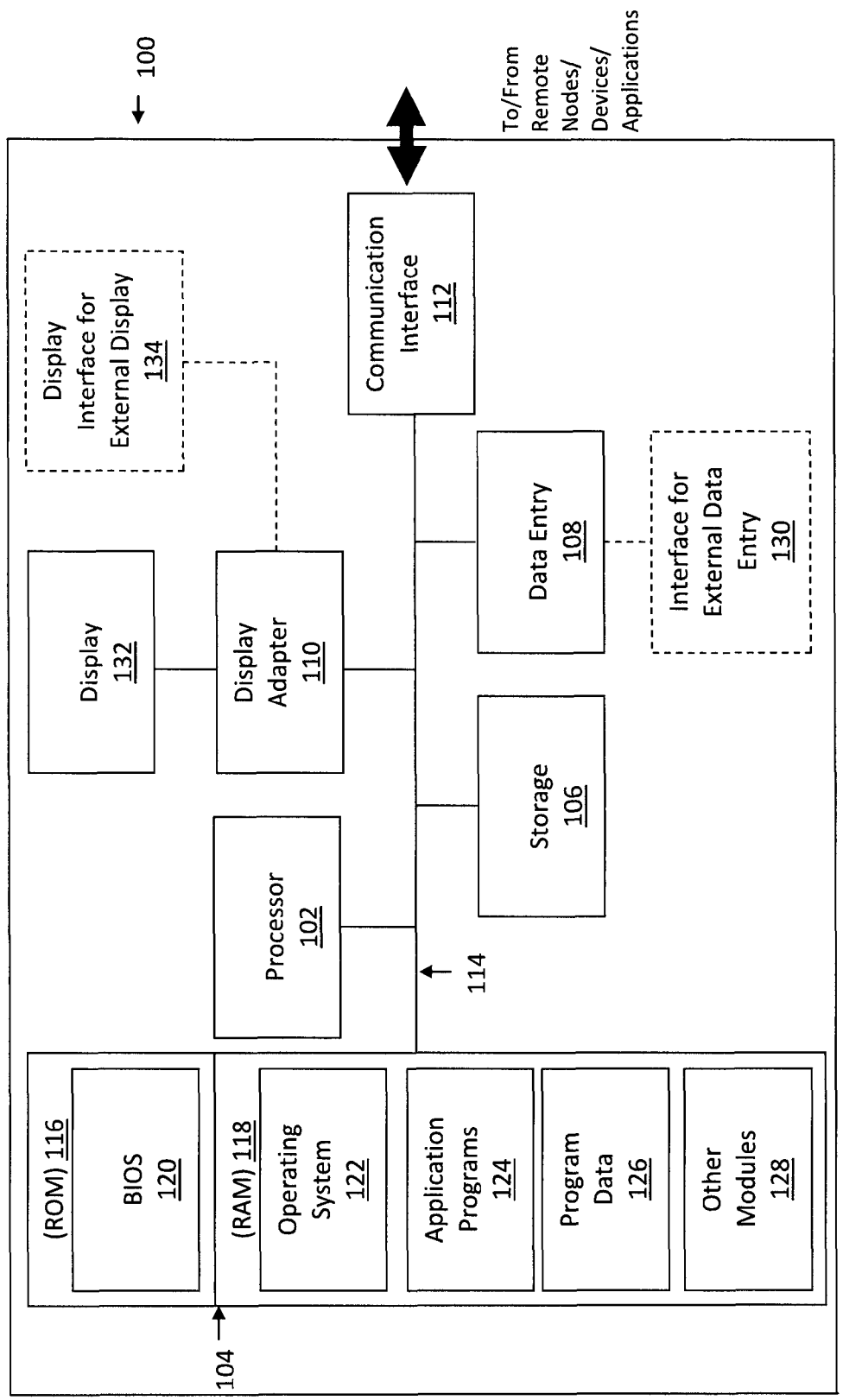
FIG. 1 is a block diagram illustrating an example hardware device in which the subject matter may be implemented.

The time required to communicate backup copies of shared volumes may be negatively impacted due to the setup configuration for the distributed system nodes, virtual machines, and shared volumes. For example, a first distributed system node may execute a first virtual machine and a second virtual machine, and send control signals to, or "own," a first shared volume and a second shared volume; while a second distributed system node may execute a third virtual machine and a fourth virtual machine, and send control signals to, or "own," a third shared volume and a fourth shared volume. When the second virtual machine is created on the first distributed system node, the available storage on the first shared volume and the second shared volume may be limited due to the significant amount of data in the database stored by the first virtual machine executing on the first distributed system node, but the fourth shared volume owned by the second distributed system node may have plenty of storage capacity available. Therefore, in this situation the second virtual machine, executing on the first distributed system node, stores its database to the fourth shared volume, which is owned by the second distributed system node.

When the first distributed system node executes a backup application to create a copy of the database stored on the fourth shared volume for the second virtual machine, the copy of the database stored on the fourth shared volume is sent initially to the second distributed system node, which owns the fourth shared volume, and then the copy of the database is sent from the second distributed system node to the first distributed system node, which requested the copy of the database. In contrast, when the first distributed system node executes the backup application to create a copy of the database stored on the first shared volume and the second shared volume for the first virtual machine, the copy of the database stored on the first shared volume and the second shared volume is sent immediately to the first distributed system node, which owns the first shared volume and the second shared volume, and which requested the copy of the database, without the additional time required for the copy of the database to be sent through the second distributed system node to the first distributed system node. Although the first distributed system node requested copies of the databases for both of the virtual machines that the first distributed system node executes, the ownership of the corresponding shared volumes determines whether or not a significant lag exists before the first distributed system node receives a copy of a database stored to a corresponding shared volume.

Embodiments herein provide backup operations for shared volumes. A shared volume is identified as used by a virtual machine scheduled for a backup operation by a first distributed system node. For example, a backup application for a first virtual machine and a second virtual machine executed on a first distributed system node identifies that the first virtual machine stores its database to a first shared volume and a second shared volume, while the second virtual machine stores its database to a third shared volume.

A second distributed system node is identified that has a responsibility for sending control signals to the shared volume. For example, the backup application determines that the first distributed system node owns both the first shared volume and the second shared volume used by the first virtual machine, and determines that the second distributed system node owns the fourth shared volume used by the second virtual machine. An association is saved of the second distributed system node to the shared volume. For example, the backup application saves an ownership map of the first distributed system node to the first shared volume and to the second shared volume, and an ownership map of the second distributed system node to the fourth shared volume.

The responsibility for sending control signals to the shared volume is assigned to the first distributed system node. For example, the backup application changes the ownership of the fourth shared volume from the second distributed system node to the first distributed system node. The backup operation is executed for the shared volume by the first distributed system node. For example, the backup application creates copies of the databases for the first virtual machine and the second virtual machine stored to the first shared volume, the second shared volume, and the fourth shared volume, with all of the copies of the databases sent directly to the first node without the copy of the database stored to the fourth shared volume being initially sent to the second distributed system node and then from the second distributed system node to the first distributed system node.

The responsibility for sending control signals to the shared volume is assigned to the second distributed system node. For example, the backup application returns the ownership of the fourth shared volume to the second distributed system node based on the saved ownership map of the second distributed system node to the fourth shared volume. The performance of the backup application improves through less lag time in sending backup copies of virtual machine databases stored to shared volumes.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for cloning enterprise management systems.

In the prior art, the time required to send backup copies of shared volumes may be negatively impacted due to the setup configuration for the distributed nodes, virtual machines, and shared volumes. Embodiments herein provide backup operations for shared volumes. The performance of the backup application improves through less lag time in sending backup copies of virtual machine databases stored to shared volumes.

Figure 2:
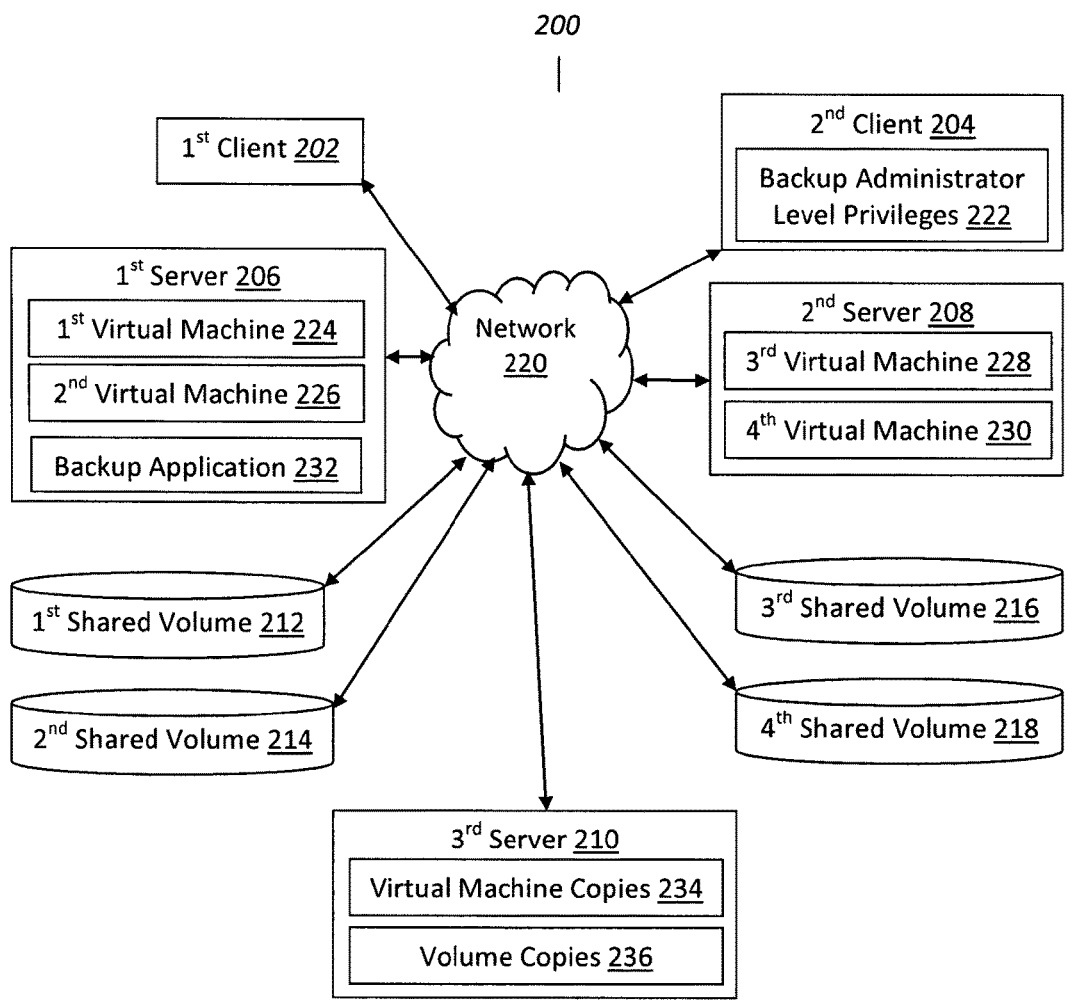
FIG. 2 illustrates a block diagram of an example system for backup operations for shared volumes, under an embodiment.

FIG. 2 illustrates a block diagram of a system that implements backup operations for shared volumes, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The first server 206 and the second server 208 may be referred to as a first distributed system node 206 and a second distributed system node 208 in a distributed system. The first server 206 is associated with a first shared volume 212 and a second shared volume 214, and the second server 208 is associated with a third shared volume 216 and a fourth shared volume 218. The clients 202-204, the servers 206-210, and the shared volumes 212-218 communicate via a network 220. Although FIG. 2 depicts the system 200 with two clients 202-204, three servers 206-210, four shared volumes 212-218, and one network 220, the system 200 may include any number of clients 202-204, servers 206-210, shared volumes 212-218, and networks 220. The clients 202-204 and the servers 206-210 may each be substantially similar to the system 100 depicted in FIG. 1.

The first client 202 enables a user to access a database application as a system user. The second client 204 includes backup administrator level privileges 222 that enable a user to access a backup application as a backup administrator. The first server 206 includes a first virtual machine 224 that may store data to any of the shared volumes 212-218, and a second virtual machine 226 that may store data to any of the shared volumes 212-218. Similarly, the second server 208 includes a third virtual machine 228 that may store data to any of the shared volumes 212-218, and a fourth virtual machine 230 that may store data to any of the shared volumes 212-218. The first server 206 also includes a backup application 232 that creates, stores, and possibly recovers virtual machine copies 234 of any of the virtual machines 224-230 and volume copies 236 of any of the volumes 212-218. The first server 206 may be referred to as a proxy server because the first server 206 may execute the backup application 232 to create backup copies for either of the servers 206-208, or any other servers not depicted in FIG. 2. The shared volumes 212-218 may be referred to as cluster shared volumes 212-218. Each of the backup copies 234 and 236 may be an image copy of data files, a proprietary format file that includes parts or all of multiple data files, a full backup copy, and/or an incremental backup copy that is stored on the third server 210.

FIG. 2 depicts the system elements 224-226 and 232 residing completely on the first server 206, the system elements 228-230 residing completely on the second server 208, and the system elements 234-236 residing completely on the third server 212. However, the system elements 224-236 may reside in any combination of partially on the first server 206, the second server 208, the third server 210, and partially on other servers that are not depicted in FIG. 2. Although FIG. 2 depicts one backup application 232 that corresponds to the servers 206-210, the shared volumes 212-218, and the system elements 224-236, the system 200 may include any number of backup applications 232 and any number of corresponding servers 206-210, shared volumes 212-218, and system elements 224-236.

A backup application identifies a shared volume as used by a virtual machine scheduled for a backup operation by a first distributed system node. For example, the backup application 232 for uses Windows® Powershell or Windows® Management Instrumentation to identify that the first virtual machine 224 stores its database to the first shared volume 212 and the second shared volume 211, while the second virtual machine 226 stores its database to the third shared volume 216.

A backup application identifies a second distributed system node that has a responsibility for sending control signals to the shared volume. For example, the backup application 232 determines that the first distributed system node 206 owns the third shared volume 216 and the fourth shared volume 218 used by the first virtual machine 224, and determines that the second distributed system node 208 owns the fourth shared volume 218 used by the second virtual machine 226.

A backup application saves an association of the second distributed system node to the shared volume. For example, the backup application 232 saves an ownership map of the first distributed system node 206 to the first and second shared volumes 212-214 and an ownership map of the second distributed system node 208 to the fourth shared volume 218.

A backup application assigns the responsibility for sending control signals to the shared volume to the first distributed system node. For example, the backup application 232 changes the ownership of the fourth shared volume 218 from the second distributed system node 208 to the first distributed system node 206.

A backup application executes the backup operation for the shared volume by the first distributed system node. For example, the backup application 232 create copies of databases for the virtual machines 224-226 stored to the first second, and fourth shared volumes 212, 214, and 218, and stores these copies of the databases as the volume copies 236, with all of the copies sent directly to the first distributed system node 206 without the copy of the database stored to the fourth shared volume 218 being initially sent to the second distributed node 208 and then from the second distributed system node 208 to the first distributed system node 206. The backup operation may be a snapshot operation performed on a disk image associated with a shared volume. The backup application 232 may also execute a backup operation for a virtual machine, such as creating copies of the first virtual machine 224 and the second virtual machine 226 and storing these copies as the virtual machine copies 234.

The responsibility for sending control signals to the shared volume is assigned to the second distributed system node. For example, the backup application 232 returns the ownership of the fourth shared volume 218 to the second distributed system node 208 based on the saved ownership map of the second distributed system node 208 to the fourth shared volume 218.

Embodiments herein provide backup operations for shared volumes. The performance of the backup application 232 improves through less lag time in sending backup copies of virtual machine databases stored to the cluster shared volumes 212-218.

Figure 3:
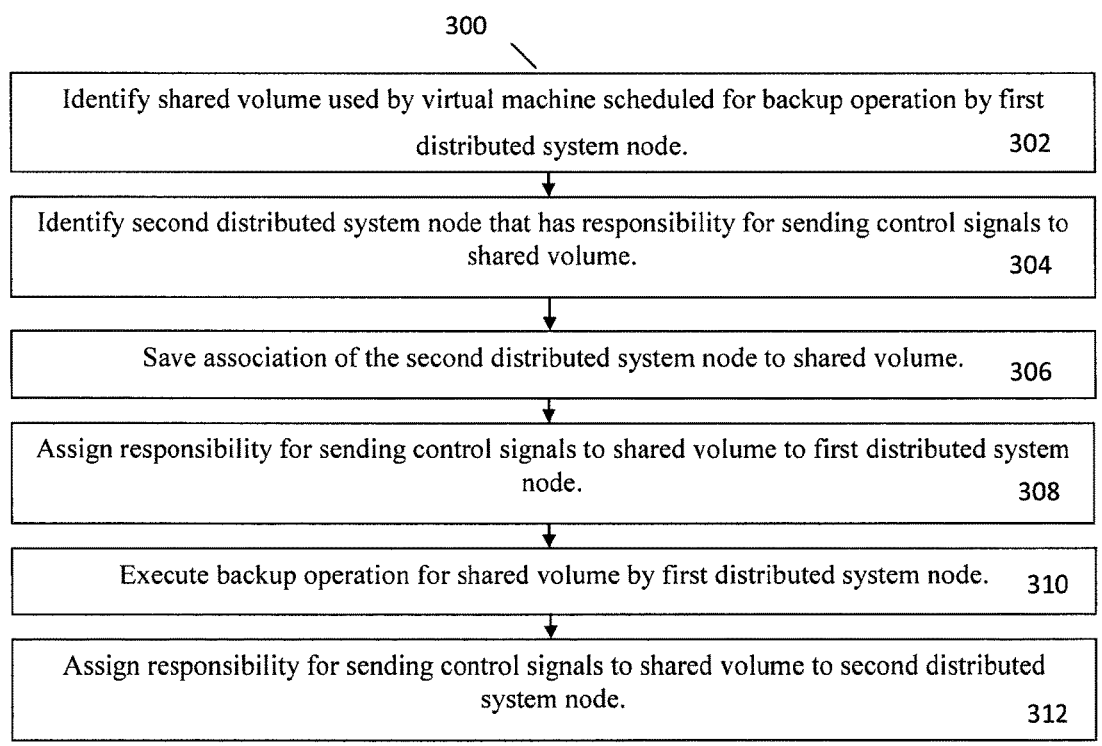
FIG. 3 is a flowchart that illustrates a method for backup operations for shared volumes, under an embodiment.

FIG. 3 is a flowchart that illustrates a method of backup operations for shared volumes. Flowchart 300 illustrates method acts illustrated as flowchart blocks for certain steps involved in and/or between the clients 202-204 and/or the servers 206-210 of FIG. 2.

A shared volume is identified as used by a virtual machine scheduled for a backup operation by a first distributed system node, act 302. For example, the backup application 232 identifies that the first virtual machine 224 stores its database to the first shared volume 212 and the second shared volume 214, while the second virtual machine 226 stores its database to the fourth shared volume 218.

A second distributed system node is identified that has a responsibility for sending control signals to a shared volume, act 304. For example, the backup application 232 determines that the first distributed system node 206 owns the first shared volume 212 and the second shared volume 218 used by the first virtual machine 224, and determines that the second distributed system node 208 owns the fourth shared volume 218 used by the second virtual machine 226.

An association is saved of a second distributed system node to a shared volume, act 306. For example, the backup application 232 saves an ownership map of the first distributed system node 206 to the first and second shared volumes 212-214 and an ownership map of the second distributed system node 208 to the fourth shared volume 218.

A responsibility for sending control signals to a shared volume is assigned to a first distributed system node, act 308. For example, the backup application 232 changes the ownership of the fourth shared volume 218 from the second distributed system node 208 to the first distributed system node 206.

A backup operation is executed for a shared volume by a first distributed system node, act 310. For example, the backup application 232 create copies of the databases for the virtual machines 224-226 stored to the first, second, and fourth shared volumes 212, 214, and 218, with all of the copies of the databases sent directly to the first distributed system node 206 without the copy of the database stored to the fourth shared volume 218 being initially sent to the second distributed system node 208 and then from the second distributed system node 208 to the first distributed system node 206.

A responsibility for sending control signals to a shared volume is assigned to a second distributed system node, act 312. For example, the backup application 232 returns the ownership of the fourth shared volume 218 to the second distributed system node 208 based on the saved ownership map of the second distributed system node 208 to the fourth shared volume 218.

Although FIG. 3 depicts the acts 302-312 occurring in a specific order, the acts 302-312 may occur in another order.

Embodiments herein provide backup operations for shared volumes. The performance of the backup application 232 improves through less lag time in sending backup copies of virtual machine databases stored to the cluster shared volumes 212-218.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for backup operations for shared volumes, the system comprising:
   a processor-based application executed on a computer and configured to:
   identify a shared volume used by a virtual machine, the shared volume being scheduled for a backup operation by a first distributed system node;
   identify a second distributed system node that has a responsibility for sending control signals to the shared volume for performing a backup operation;
   save an association of the second distributed system node to the shared volume;
   transfer, to the first distributed system node from the second distributed system node, the responsibility for sending control signals to the shared volume to the first distributed system node;
   execute, by the first distributed system node, the backup operation for the shared volume in response to receiving the responsibility for sending the control signals to the shared volume from the second distributed system node; and
   transfer, based on the saved association, the responsibility for sending control signals to the shared volume back to the second distributed system node.

2. The system of claim 1, wherein the shared volume comprises a cluster shared volume.

3. The system of claim 1, wherein the backup operation comprises a snapshot operation performed on a disk image associated with the shared volume.

4. The system of claim 1, wherein the first distributed system node comprises a proxy node.

5. The system of claim 1, wherein the responsibility for sending control signals to the shared volume comprises ownership of the shared volume.

6. The system of claim 1, wherein the association of the second distributed system node to the shared volume comprises an ownership map of the second distributed system node to the shared volume.

7. The system of claim 1, wherein executing the backup operation for the shared volume comprises executing the backup operation for the virtual machine.

8. A computer-implemented method for backup operations for shared volumes, the method comprising:
   identifying a shared volume used by a virtual machine, the shared volume being scheduled for a backup operation by a first distributed system node;
   identifying a second distributed system node that has a responsibility for sending control signals to the shared volume for performing a backup operation;
   save an association of the second distributed system node to the shared volume;
   transferring, to the first distributed system node from the second distributed system node, the responsibility for sending control signals to the shared volume to the first distributed system node;
   executing, by the first distributed system node, the backup operation for the shared volume in response to receiving the responsibility for sending the control signals to the shared volume from the second distributed system node; and
   transferring, based on the saved association, the responsibility for sending control signals to the shared volume back to the second distributed system node.

9. The computer-implemented method of claim 8, wherein the shared volume comprises a cluster shared volume.

10. The computer-implemented method of claim 8, wherein the backup operation comprises a snapshot operation performed on a disk image associated with the shared volume.

11. The computer-implemented method of claim 8, wherein the first distributed system node comprises a proxy node.

12. The computer-implemented method of claim 8, wherein the responsibility for sending control signals to the shared volume comprises ownership of the shared volume.

13. The computer-implemented method of claim 8, wherein the association of the second distributed system node to the shared volume comprises an ownership map of the second distributed system node to the shared volume.

14. The computer-implemented method of claim 8, wherein executing the backup operation for the shared volume comprises executing the backup operation for the virtual machine.

15. A computer program product, comprising a non-transitory computer-readable medium having a computer-readable program code embodied therein, the computer-readable program code adapted to be executed by one or more processors, the program code including instructions to:

identify a shared volume used by a virtual machine, the shared volume being scheduled for a backup operation by a first distributed system node;

identify a second distributed system node that has a responsibility for sending control signals to the shared volume for performing a backup operation;

save an association of the second distributed system node to the shared volume;

transfer, to the first distributed system node from the second distributed system node, the responsibility for sending control signals to the shared volume to the first distributed system node;

execute, by the first distributed system node, the backup operation for the shared volume in response to receiving the responsibility for sending the control signals to the shared volume from the second distributed system node; and transfer, based on the saved association, the responsibility for sending control signals to the shared volume back to the second distributed system node.

16. The computer program product of claim 15, wherein the shared volume comprises a cluster shared volume, and wherein the first distributed system node comprises a proxy node.

17. The computer program product of claim 15, wherein the backup operation comprises a snapshot operation performed on a disk image associated with the shared volume.

18. The computer program product of claim 15, wherein the responsibility for sending control signals to the shared volume comprises ownership of the shared volume.

19. The computer program product of claim 15, wherein the association of the second distributed system node to the shared volume comprises an ownership map of the second distributed system node to the shared volume.

20. The computer program product of claim 15, wherein the program code for executing the backup operation for the shared volume comprises further instructions to execute the backup operation for the virtual machine.

* * * * *